(12) United States Patent
Gramsamer et al.

(10) Patent No.: US 6,959,308 B2
(45) Date of Patent: Oct. 25, 2005

(54) ARCHIVING AND RETRIEVAL METHOD AND APPARATUS

(75) Inventors: Ferdinand Gramsamer, Wettswil (CH); Peter Micheal Klett, Horgen (CH); Beat Liver, Adliswil (CH); Hong Linh Truong, Richterswil (CH)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 09/789,078

(22) Filed: Feb. 20, 2001

(65) Prior Publication Data

US 2001/0016851 A1    Aug. 23, 2001

(30) Foreign Application Priority Data

Feb. 17, 2000  (EP) ................... 00810134

(51) Int. Cl.$^7$ ............................................. G06F 17/30
(52) U.S. Cl. ..................... 707/200; 707/9; 713/200; 713/182
(58) Field of Search ............ 707/1–10, 100–104.1, 707/200–206; 713/182–185, 200; 709/203, 709/225; 715/501.1

(56) References Cited

U.S. PATENT DOCUMENTS

| | | | |
|---|---|---|---|
| 5,740,428 A * | 4/1998 | Mortimore et al. | 707/104.1 |
| 5,950,207 A * | 9/1999 | Mortimore et al. | 707/104.1 |
| 6,286,001 B1 * | 9/2001 | Walker et al. | 707/9 |
| 6,385,614 B1 * | 5/2002 | Vellandi | 707/9 |
| 6,389,420 B1 | 5/2002 | Vahalia et al. | 707/8 |

FOREIGN PATENT DOCUMENTS

JP       05-061737 A  *  3/1993

* cited by examiner

Primary Examiner—Shahid Alam
Assistant Examiner—Jean Bolte Fleurantin
(74) Attorney, Agent, or Firm—Ronald L. Drumheller; Richard M. Goldman

(57) ABSTRACT

The invention relates to a method and an arrangement for maintaining an organized and automated archiving and retrieval system including a personal bibliography of original documents or other original real objects as well as an electronic archive containing copies of such original real objects with guaranteed access. Essentially this is done by establishing a machine and/or human readable "unique identifier" (UID) distributed with each original real object, a so-called personal archive allowing a person (or a group of persons) to maintain a personal bibliography, a managed storage containing electronic copies of the distributed original real objects, and means for a controlled, but guaranteed access to the stored electronic copies. The unique identifier UID will be established and controlled, usually by a service provider, and attached to each original (document) when it is distributed, usually by the publisher, so that it can be read by the user, preferably with a simple reader for entering it electronically into his personal archive. The personal archive may be maintained either by the person or by another (or the same) service provider, but is personalized in the sense that the user determines the contents of his/her archive. A controlled access system with access certificates, which may be time-limited, issued to the requesting user guarantees user access to the stored electrinic copies. Access control will again be provided as service, be it by the publisher or any of the service providers mentioned.

11 Claims, 2 Drawing Sheets

ARCHIVING AND RETRIEVAL METHOD AND APPARATUS

FIELD OF THE INVENTION

Figure 1:
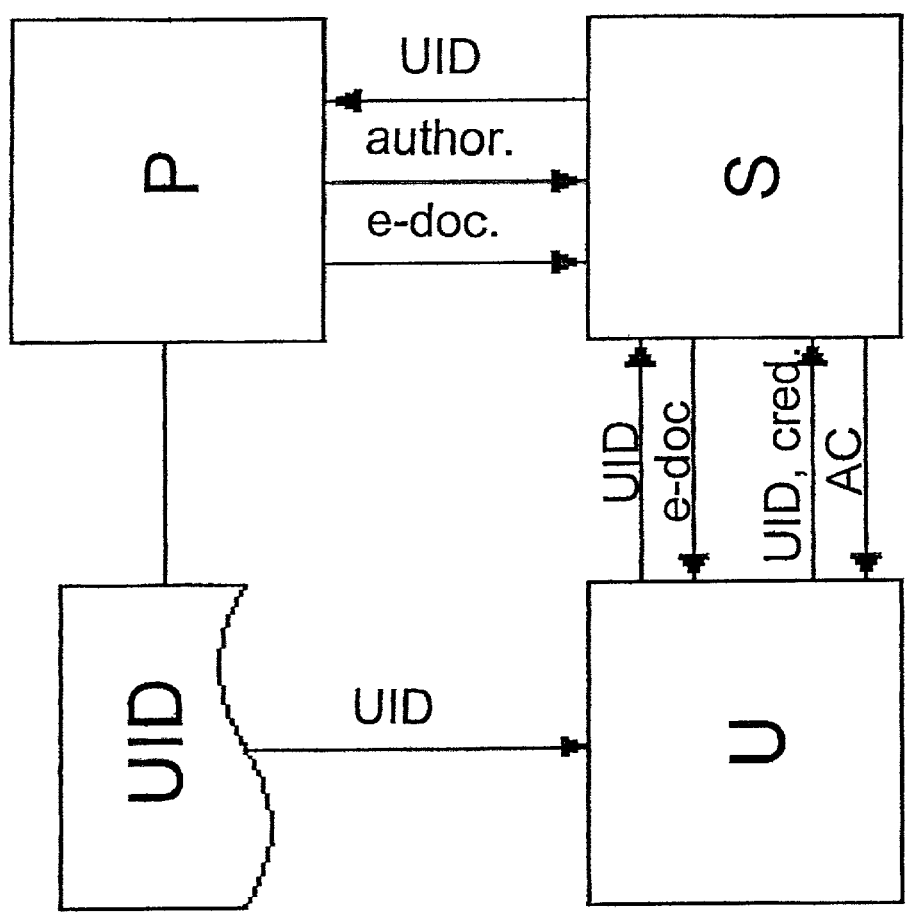

This invention relates to a method and an apparatus for maintaining a personal bibliography of printed and electronic original documents or other original objects as well as an electronic archive of those originals in an automated manner. Essentially, this is done by establishing a machine and/or human readable "unique identifier" (UID) for each original, a personal archive (p-archive) allowing a person (or a group of persons) to maintain a personal bibliography, a storage containing electronic copies (e-documents) of the originals, and means for providing guaranteed and controlled access to these stored copies. Whereas it is envisioned that the unique identifier UID will be generated and controlled by a service provider and attached to each original so that it can be read by the user, perhaps even with a simple, hand-held device for entering it electronically into the user's p-archive, the p-archive itself is envisioned to be maintained either by the user or by another (or the same) service provider, but is personalized in the sense that the user determines the contents of his/her archive. The means guaranteeing the controlled access to the electronic copies of the originals will usually be provided by a service organization, be it a publisher or any of the service providers mentioned.

INTRODUCTION AND PRIOR ART

When reading a printed article, be it in newspapers, journals or books, scientists and readers in general often come to the point that they want to preserve this article either for reading profoundly later on, or for re-reading some parts of it, or simply for archiving purposes. Typically the article is then copied in paper form. Over time, this creates a lot of paper waste and big amount of lost time. Also the time needed for archiving and indexing hard copies, e.g. to enable later search, is not negligible.

Printed media like magazines or journals, particularly for academia, but also for non-academia or leisure purposes get more expensive, while at the same time the number of readers as well as private or public subscribers diminishes. Publishers are therefore interested in keeping or winning new customers and are thus looking for new services to offer to their readers.

With the advent of the Internet and its wide acceptance, the electronic counterpart of documents is found more and more frequent online. As of today, the usual identification of a document is its URL (uniform resource locator) or its URI (uniform resource identifier). Unfortunately, the online availability of documents is by no means guaranteed, and furthermore a unique identification of documents is not given by either of the above identifiers. Especially, there is no common identifier of a printed version and its electronic equivalent which makes the latter hard to find, hard to administer, and also hard to reference.

In newspapers and many scientific papers and articles, even patents, one finds today often www links, i.e. usually URLs, as footnotes. Though such links may sometimes point to the paper or article in electronic form, they more typically point to web pages of manufacturers of products or pages with additional information. And if they actually point to a paper in electronic form, it is not guaranteed that this is the paper that was originally referenced and/or that it is still unaltered and/or that it still exists and/or that it is still available under the same URL.

In the journal c't, 1999, Vol. 20, pp. 216–222, Richard Sietmann describes in the Report Elektronisches Publizieren "Zirkelspiele" various models for subscriptions, site licenses, pay-per-view, and peer-review. However, none of these models relate to a unique identifier which may be used to address or find a particular document in an archive or similar arrangement. This publication shows an increasing trend towards electronic publication and gives a hint towards the anticipated importance of the proposed scheme.

In the intellectual property field, a well-known computer company provides a so-called "patent server" which provides a retrieval possibility for millions of patents of various countries. Since patents are usually identified by a number and often by a machine-readable bar code, they are a rather perfect basis for a long-term, centralized and computerized archiving and retrieval system. However, since the patent number is still a national number, i.e. identical numbers exist for different countries, it is not a unique identifier by itself. Also, the bar code, if available, was originally intended for a certain national patent office's internal use and is by no means standardized. Furthermore, with the presently offered access, one cannot acquire an option or reserve the right to retrieve a specific patent in the future, i.e. there is no real guarantee that the patent will be available the next day under the same identifier in this patent server system. Consequently, though this patent server system shows an approach in a special field pointing somewhat in the same direction, it does not show the universal approach that the present invention intends to provide.

Generally speaking, URLs and even URIs have the following shortcomings: URLs are frequently outdated, e.g. an URL pointing to a previously current, but now outdated issue of a journal. Assuming the user has sufficient information, a search facility may be used to retrieve the correct document, but this is cumbersome and not at all effective. Another option would be to download the corresponding e-document immediately; but this is not always possible or practical.

Also, the right to access a given URL or URI may depend on a subscription. In this case, access to an e-document of an issue obtained through the subscription is usually limited to the time a reader has a subscription. Again, this is inadequate for a personal archive. Consequently, there are obvious shortcomings of the approach of using an URL or URI as identifier for archiving purposes.

Here, the present invention provides a solution by selecting a novel overall approach which allows easy recording and retrieving articles of any printed newspaper, magazine, journal, catalogue, books, brochure, or the like. In other words, the invention fills the missing link between printed or other "hard" media, i.e. real objects (here mostly documents), and their electronically available "soft" versions (here generally e-documents).

SUMMARY OF THE INVENTION

The invention is built around what is called a "p-archive", short for personal archive, and a "UID", short for unique identifier. The p-archive is personalized in that it represents the archive of a user who therein can store a list of real objects, such as books, articles, pictures, videos, audio files, etc., with other words, the electronic equivalent of any object, e.g. a picture of a sculpture, an article of a newspaper or of a science journal, the copy of a lecture or speech stored as audio file, or even the multimedia copy of a movie. In the following, since it is envisaged that the invention will be used primarily in the printed-matter environment and since the described embodiment is concentrating on such a use, it will be referred to the original or hard copy of such an object as document and to its electronic equivalent as e-document, as mentioned above.

The invention makes use of the fact that today practically most of the articles, be it newspapers, scientific journals or even books, are somewhere lying in electronically readable form and that access to them via the Internet or an intranet is relatively easy and fast and possible from almost anywhere. A first aspect of the invention is to identify for each and any document, i.e. printed article, a unique identifier UID referring to this document and its e-document, i.e. its electronic counterpart. Uniqueness of the identifier means that it is sufficiently unique within a certain space that the document it refers to can unambiguously be identified and found when the unique identifier is given. Ideally, the unique identifier UID is unique in the absolute sense, like the uniform resource locator URL of the Internet is. However the unique identifier here does not need this absolute uniqueness, but can be unique e.g. for a certain service provider who uses the unique identifier as address or identifier for the documents deposited in the server of the service provider. In a second aspect, at least one p-archive is provided, i.e. a personal archive, usually maintained by a user for managing unique identifiers UID as well as his/her personal subjects and annotations. The third aspect is to provide a means for accessing the UID-identified e-document on a safe, long-term basis.

DESCRIPTION OF AN EMBODIMENT

Figure 2:
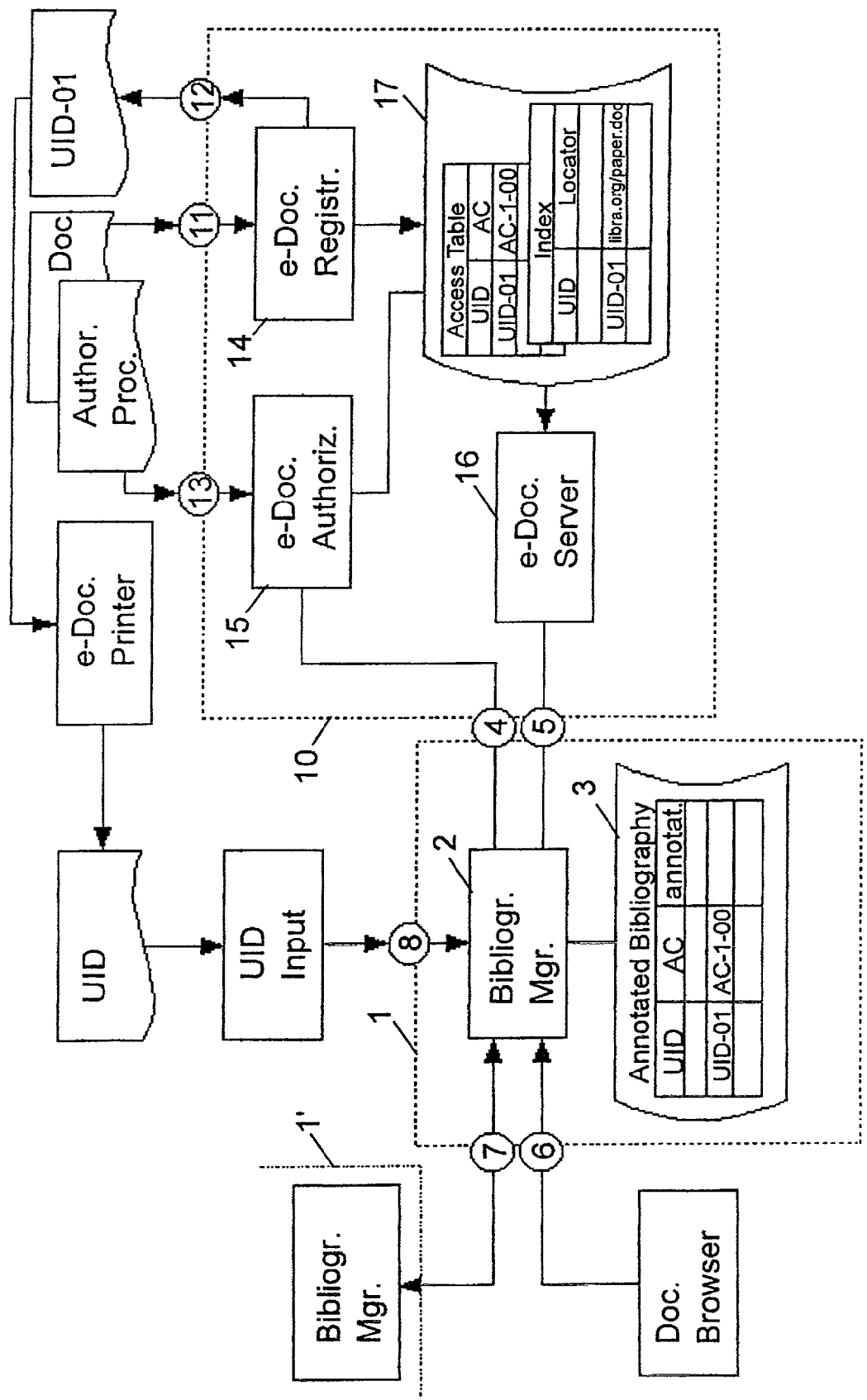

In the following, the invention will be described in form of an embodiment in connection with the drawings which illustrate in FIG. 1 a chart of the data and the control flows of a system according to the invention;

FIG. 2 an overview of the architecture of such a system.

GENERAL MODEL OF THE INVENTION

The general model as shown in FIG. 1 consists essentially of three main units that interact with each other, a publisher P, a service provider S, and a user/reader U. There is a primary or data flow, and there is a secondary or control flow between the blocks.

Primary Flow

The publisher P transmits an e-document E to a service provider S, and will receive therefor a unique identifier UID. The publisher P obtains the right to attach this unique identifier UID to all paper or electronic copies of the e-document E. Thus, all existing instances of the e-document E are uniquely identified and identifiable.

When the service provider S receives and accepts the e-document E, he becomes the authority for "controlling" the unique identifier UID and the distribution, e.g. granting access to this e-document. For this, the service provider S will store the e-document E in an archive. It is also possible that the service provider S first gives out one or more unique identifiers UID to the requesting publisher P, who then sends the e-document E with the embedded, i.e. attached unique identifier UID to the service provider S. This method ensures that the unique identifier UID is in fact attached to the right document. Or the service provider S attaches the unique identifier UID to the e-document E and returns it to the publisher P.

The user U accesses, purchases or receives a document with the unique identifier UID attached. He/she may also obtain the unique identifier UID of a document elsewhere, e.g. from a citation in another document. The user U may enter the unique identifier UID of the document into his p-archive by an electronic reading device, by typing, by receiving it from someone else electronically, or by any other method that will serve the purpose. The user U may then at any time use the stored unique identifier UID and present it to the service provider S, and via an authorization scheme, as explained below, be granted access to the e-document E, i.e. a copy of said original document.

Secondary Flow

As also shown in FIG. 1, the service provider S is the administering instance, not only for storing the e-document E, but also for access control thereto. It shall be explained how this is achieved in the following.

The publisher P may authorize a certain user U or a group of users to retrieve the e-document E at any time. The publisher P may do so because of information he possesses for example from a subscription or a contract he has concluded with, for instance, a library. The authorization principle according to which the access certificates are to be issued to the user U presenting the unique identifier UID, is referred to as access policy and may be based on a person listing, specific person features, time, or include some kind of temporary special arrangement like an introductory offer. The time that the e-document E is maintained by the service provider S does not necessarily have to be infinite. The time span can depend on what the publisher P has promised to its customer, i.e. user U. This is an issue of how attractive the publisher P wants to be to the user U, and also, how much the publisher P or the user U is willing to pay the service provider S for this service. Alternatively, the publisher P may even authorize all users U, i.e. everybody in possession of a particular unique identifier UID.

Access control the to the stored e-documents E is managed by issuing a so-called access certificate AC to a user U requesting such for a particular e-document E identified by its unique identifier UID. In the example described, the service provider S issues such an access certificate AC which provides the requesting user U with the right to access the identified particular e-document E.

Typically, general user authorization information, i.e. an access policy, is stored at the service provider S, given to him by the publisher P. As explained above, the service provider S manages the access rights of the user U by means of access certificates AC.

In order to identify a specific user U for elaborating his/her eligibility to obtain an access certificate AC, user credentials may be used. They are sent by the user U and checked for compliance with the access policy either stored at the publisher P or at the service provider S, moving the authorization process to either the publisher P or the service provider S.

For the user U, the unique identifier UID basically just indicates the option to retrieve the e-document E for a period of time determined by the publisher P. If no user turns in the option, nothing will happen and all options may expire after some time, for instance after 10 years. However, if the user U does turn in the option, he/she will claim his/her rights by sending to the service provider S the respective unique identifier UID together with his/her credentials, e.g. his/her userID. As a result of this "registration process", the user U will receive an access certificate AC from the service provider S. For retrieving the e-document E, the user U turns in the access certificate AC, together with his/her identification. He/she can do this several times as long as the e-document E is available. If the user U is not registered, he/she can register himself/herself by paying the service provider S directly. The payment may become due when the user U actually retrieves the e-document E. The fees for retrieval of the e-document E are typically less than the price of a hard copy.

It should be already apparent that all participating parties, i.e. the users/readers U, the publisher P, and the service provider S, will benefit from the introduction of such a system, not only by a simpler and safer archiving/retrieval process, by saving memory space and gaining access time, but also in a business sense. This will be even more obvious from the following.

On one hand, the invention provides the user U, usually a human reader, with a technical means for easily keeping and managing references and accessing or retrieving articles of newsmagazines, magazines, newspapers, catalogues, books, even brochures or the like. The user U often saves time, because he/she does not necessarily need to copy an article. Usually, his/her list of unique identifiers UID together with the short description or abstract of the articles suffices since it is searchable and easy referencable. He/she also usually saves money since the articles, whose unique identifier UID has been read and stored, can be put on hold and be downloaded only when the article is really needed; this aspect becomes particularly interesting, if only a chapter or section of a book or of a longer article is of interest. The latter case requires that unique identifiers UID be given out per chapter or section.

On the other hand, the invention gives the publisher P the opportunity of technically monitoring which subjects or themes are actually popular, whether there is a trend, which writer is well accepted, which articles face a greater demand and/or which methods have which effect on this demand. This feedback can even be achieved on a per-customer basis. It can also be used to improve the manner of offering articles, their styles and selection, etc. Further, the offering of e-documents, because of its obvious benefits to the users U, can be a valuable marketing possibility and tool, a service helping the publisher to keep or increase his clientele.

Finally, a service provider S has the opportunity to deliver a technical service to both a user U and/or a publisher P. This is a novel technical business opportunity per se. The service provider S has a definite interest in serving as official contact point for anybody who wants to make available an electronic document and to anybody who wants to access such a document, using the unique identifier UID as standardized identifier.

The advantage of the system becomes also apparent when the economic side related to the different actions is visualized, also shown in FIG. 1. The largest potential exists for the service provider S, as he is the managing and administering unit in the center of the system. The service provider S can claim compensation from the publisher P for handing out the unique identifiers UID, for storing the e-documents E and for guaranteeing the access thereto for a certain period of time. Another technical and business aspect can be the delivery of statistical data to the publisher P, since the service provider S can monitor the user behavior for each single document and give this feedback for a compensation to the publisher P who can utilize this information for optimizing his business. In this way, the system is comparable to the INTERNIC model of centrally managing Internet domain addresses and giving them to users who pay an annual fee therefor. The service provider S can also realize business opportunities directly with the users U: There is the handout of the access certificate AC to the user U; there is the actual realization of the option by the user U, i.e. the request for retrieving the e-document in exchange for presenting the access certificate AC. To the user U, the whole system will appear efficient when the total effort, including the time spent and the cost paid for the options, is in the end lower than what he/she would have invested for the documents if he/she had copied them or downloaded right away. A further positive effect is that the user U does not need to provide memory capacity for any not-requested e-documents E.

All these positive effects may render the system worthwhile even for companies to use the system intracorporational, since the expenditure on paper copies of scientific articles, e.g. copier maintenance, paper, toner, work time, archiving, storage place, waste costs, etc. will significantly drop when using the proposed archiving and retrieval system. Experience shows that far too much is copied and never read.

From a technical and business perspective, the service provider S has to deal with a large clientele. It should hence be an entity having the exclusive authority of issuing the unique identifiers UID and having the capacity of storing all e-documents E. In practice, this may best be realized by a distributed server system, where the e-documents E can be stored at any place and be found and retrieved by an intelligent searching mechanism, like the IP-routing method already provides. Also, the authority can be distributed by having one central authorization entity or instance giving, i.e. licensing, sub-authorizations to other entities, e.g. other companies, who then administer their own unique identifier space and can issue the unique identifiers UID independently from other such entities.

Finally, a technical program product, also licensable to others, is the software for the user U and for the publisher P that operates along with the service provider S.

This can be a simple tool for the publisher P with an interface that allows to send the e-documents E for registration and the access policy, i.e. authorization lists, and that receives the unique identifiers UID and provides an interface to text-processing programs for embedding or attaching, respectively, the unique identifier UID. The tool for the user U allows him/her to read in the unique identifier UID, provides a list with editing functionality for the unique identifiers UID, allows to send the unique identifiers UID to the service provider S together with his credentials for user authentication, receives the access certificate AC and provides the request facility for the e-document E itself. Electronic payment can also be integrated automatically into all of said tools.

Imagining a global acceptance of the scheme by using a globally standardized and accepted identifying scheme (as is done in the Internet with the address space), each and every document and even parts thereof can bear a unique identifier.

After this more general introduction into the working, the background, and the advantages of the invention, follows a more detailed description of the various aspects of an embodiment.

Unique Identifier

Like an ISBN (international standard book number) number or an URI (universal resource identifier), the unique identifier, short UID, is a location-independent identifier for a document and its e-equivalent. Such a unique identifier UID is preferably printed in a machine and/or human readable code onto the document. An example for a similar approach is the EAN, i.e. the European article number, on general merchandise which includes a bar code, for which many readers are on the market. Another approach would be to use watermarks on the original documents, which watermarks are solely machine-readable. Further, the machine-readable format of the unique identifier UID may be used by a PDA, i.e. a personal digital assistant, or a similar device to scan it into a person's p-archive.

The p-archive shown in FIG. 2 consists of one or more p-archive clients 1 and one or more p-archive servers 2. This will be explained in detail below.

The p-Archive Client

The example of a p-archive client 1 as shown in FIG. 2 consists essentially of a bibliography manager 2 and an annotated bibliography 3. The latter is a database consisting of tuples of a unique identifier UID, an access certificate AC, and a multimedia annotation, which includes unique identifiers UID and possibly other cross references.

The unique identifier UID, as explained above, refers to a particular article, a bibliographic information and an abstract, or a whole collection of articles, etc. In case of collections, each of the collected documents can have its own unique identifier UID as well.

The access certificate AC is issued by a p-archive server and defines the rights of a particular person or group of persons with respect a specified unique identifier UID, and an identification of the person or group. This identification can be a certificate, a user name and password, or a token that cannot be duplicated, etc. For example, paying the newspaper with a smartcard at a kiosk may include the transfer of a token granting access to the electronic version of the whole purchased newspaper. The identification is used for user authentication in case of access to documents.

The annotation is an annotation of the user U to his/her bibliographic entry and may contain personal additions as text, hypertext, voice or video recording.

The p-archive client 1 has its own access control list ACL, not shown in FIG. 2, for the bibliography database. In contrast to access certificates AC, the access control list ACL is under control of the owner of a particular bibliography database. Such access control lists were described by Castano, Fugini, and Samenti in "Database Security", ACM Press 1994, Chapter 3.4 "Access Control to Resources".

The client's bibliography manager 2 has five interfaces 4 to 8. A client might support additional interfaces for, e.g. exporting a bibliography to a word processor. Interfaces 4 and 5 are explained further down in connection with the detailed description of the p-archive server 2. Interfaces 6 to 8 shall be explained next.

The interface 6 is used by a document browser to search and browse bibliographies and edit bibliography entries. If the p-archive client 1 is a service available in the Internet, this document browser may be standard web-browser, supporting HTTP and HTML formats, for instance.

The interface 7 specifies the communication between p-archive clients 1, i.e. it allows the exchange of bibliography entries with another p-archive client 1'. Any access certificates AC are only exported if the owner of the receiving bibliography database has the appropriate rights, e.g. if he/she is a member of a group specified in the appropriate access certificate AC. In particular, if the bibliography database in the other p-archive client 1' is a replicating database, whose entries are synchronized with the entries in the database of client 1, the access certificates AC may be also replicated.

The interface 8 is the interface to a reader that reads the unique identifiers UID. The unique identifier UID format and protocol is thus determined by the reader. Of course, the user U might also manually enter a unique identifier UID via the interface 6.

The p-Archive Server

The p-archive server 10 consists essentially of a registration module 14, an authorization module 15, a document server 16 and a database 17. The registration module 14 serves to register the unique identifiers UID and relate them to the appropriate e-document E. The authorization module 15 is not concerned with the authorization of the users U of the p-archive server 10, but for instructing the document provider P according to which policy the acess certificates AC are to be issued. For this purpose, the p-archive server 10 maintains its own access control list ACL—not shown in FIG. 2.

In the following, the interfaces of the p-archive server 10 shall be described. Two interfaces 4 and 5 connect the p-archive server 10 with the p-archive client 1. Apart from these two, the p-archive server 10 has three other interfaces.

The interface 11 is used to register the e-documents E. For this purpose, an e-document E is transferred via the interface 11, e.g. by the publisher P. The registration module generates a unique identifier UID for this e-document E, archives the e-document E under this unique identifier UID, and returns the unique identifier UID to the publisher P, or, in the example shown here, the e-document with the unique identifier UID attached, via the interface 12. The return address may be specified by the publisher P. In the case described here, the publisher P also owns the archive entry since he has registered the e-document E. The access rights to this e-document E are determined by the publisher P.

The interface 12, mentioned already above, provides the unique identifiers UID in formats appropriate for different destinations, here the publisher P. Exemplary formats are PS, PDF, or any other printer or publishing format.

The access policy for issuing the access certificates AC is transmitted via the Interface 13. For this purpose, the publisher P selects a unique identifier UID which he owns or has the right to use, and specifies the required rights and necessary identifications to obtain access to said unique identifier UID. After authorization by checking compliance with the transmitted policy, e.g. checking a subscription database, a regular access certificate AC is created and issued.

The interfaces 11 to 13 are used by a document provider, i.e. the publisher P, to make the corresponding e-documents E available to the p-archive via the service provider S. For performance, reliability, and organizational reasons, there are usually several servers provided. This invention is not concerned with directory or location services to determine an appropriate site, as the extension is straightforward. The p-archive clients 1 consult a directory service, e.g. their home p-archive server 10. The only requirement is that each unique identifier UID is unique, which means that it is the same for all p-archive servers 10.

Next, the interaction between the p-archive client 1 and the p-archive server 2 is discussed in terms of the interfaces 4 and 5.

The interface 4 is used by the client 1 to obtain the access certificate AC for a unique identifier UID, the access certificate AC to-be-added to the bibliography as soon as this step can be carried out, i.e. the client 1 is online. By establishing the access certificate AC, access is ensured even if the e-document E is no longer available by other means, e.g. in the digital archive of a newspaper subscription. After generating the access certificate AC, the service provider S "knows" that he is obliged to allow access to the respective, identified e-document E. For obtaining the access certificate AC, the client 1 sends the respective unique identifier UID and the user's credentials to the server 2. These credentials will usually include a user identification, e.g. a userID and password or a certificate, and a certificate specifying the rights this user U has to the respective e-document E. This certificate may include a token or other means serving the purpose. The authorization module 15 evaluates the user's credentials and returns the appropriate access certificate AC, if there is one. The interface 5 is used by the p-archive client 1 to retrieve the e-document E for a given unique identifier UID and access certificate AC.

It is apparent from the above that the unique identifier UID is so-to-speak the point of synchronization of the system. Using the unique identifier UID for obtaining the access certificate AC enables the service provider S to keep track of pending potential access requests.

It would technically be possible to define a kind of expiration date after which the unique identifier UID can no longer be used. Once a certain time has passed and no unique identifiers UID have been presented to the service provider S and/or the publisher P, they may delete the e-document E, or at least stop granting access. This timing scheme is mainly an issue between the publisher P and the service provider S and may be subject to an adequate compensation. An alternative could be to increase the price with time, since the longer any e-documents E are stored, the more expensive is it to administer them, because the number of e-documents E "naturally" increases over time.

Since the user U collects the various unique identifiers UID, but has only this code and no other information about the documents available on his system, he/she may need some limited document information for managing the unique identifiers UID for the documents in his/her list, i.e. in the p-archive, and eventually for editing the latter to sort out the documents needed and discard those not required. This limited information should be in some way accessible by the user U. Such a service could easily be provided by the service provider S. Then, by sending the unique identifier UID to the service provider S, the user U may obtain such information as title, author, abstract, and, based on this information, decide which of the documents in his/her p-archive are important. For obtaining information about whether he/she may later download the e-document, the user U identifies himself/herself and sends together with the unique identifier UID his/her identification, i.e. credentials. The service provider S returns either the access certificate AC as a granted right, or an information that the user U does not yet have an access right. The user U can then decide whether to look how he/she can acquire that right, or not. Once having the access certificate AC, the user U can send or present this to the service provider S and get access to the appropriate e-document E in return. It is conceived that the access certificate AC is personalized and not copyable, to prevent unauthorized reproduction and piracy.

Since the system has three essential participants, the perspective for each of them shall be explained.

The Publisher P

The publisher P offers a method for managing an access right to an e-document by providing a user U with a unique identifier UID for each document readable by said user, whereby said unique identifier is usable for requesting at a service provider S the issuance of an access certificate AC that allows the user U to download the e-document E at a later point in time.

The publisher P may also offer a method for storing an e-document E for later retrieval by a user U. This method comprises the steps of requesting at a service provider S the issuance of a unique identifier UID for said e-document E, receiving said identifier UID, storing or having stored said e-document E at a place accessible by said service provider S for providing an access certificate AC to the user U requesting access via said identifier UID, and upon being presented the access certificate AC, granting access to the respective e-document E.

The User U

The user U may obtain an access right to the e-document E by reading its unique identifier UID, sending said unique identifier UID to the service provider S and requesting the issuance of an access certificate AC that allows him/her to download (or otherwise access) the respective e-document E at a later point in time. This could be implemented by having the user U retrieve the e-document E from the service provider S in exchange for the access certificate AC he/she sends to said service provider S.

The Service Provider S

The service provider S offers a method enabling the publisher P to grant an access right to the e-document E by issuing a unique identifier UID for said e-document E to said publisher P, guaranteeing the access to said stored e-document E, and, upon receiving of or being presented said unique identifier UID from a user U, issuing an access certificate AC to said user U representing said access right.

Alternatively, the service provider S may offer a method for granting an access right to the e-document E to the user U by issuing an access certificate AC to said user upon reception of the unique identifier UID identifying said e-document E, said access certificate AC enabling the user U to request at a later point in time the access to or transmission of the respective e-document E.

To further clarify the invention, but without limiting its broad applicability, a sample embodiment and its various functions shall be described in the following.

Functional Example of the Invention

The publisher P intends to issue a magazine M with 10 articles. The publisher P therefore requests for each article an unique identifier UID at an unique-identifier-generating instance, e.g. a service provider S. This instance creates the unique identifiers UID and allocates each of them to one of the articles. The unique identifiers UID are sent via the Internet to the publisher P who receives them and prints them directly into the respective articles. By attaching one and only one unique identifier UID to each article, each article becomes clearly identifiable and therefore referencable in the future. In the present example, the unique identifier UID is a barcode identifying the article, plus containing additional information, as explained below.

The magazine M gets published whereby each article carries its unique identifier UID. The publisher P generates an electronic version (e-document E) of each article that now carries its unique identifier UID. The e-documents E are identical to their respective hard-copy counterpart, i.e. the published article. These e-documents E are sent by the publisher P in PDF format to the service provider S who stores the e-documents E with their respective unique identifier UID in a database on a server represented by the p-archive server 10 in FIG. 2.

Additionally, the publisher P determines an access policy determining the conditions under which each stored e-document E may be accessed in the future. Exemplarily, the access policy says that all registered subscribers to the published magazine M can access and retrieve all articles of said magazine unconditionally. This access policy is also sent to the service provider S.

The service provider S and the publisher P also negotiate expiration rules for each e-document. Thereby, the service provider S has a general interest that each e-document E expires as early as possible, since it consumes storage space and the public interest in those articles is assumed to decrease rapidly with time. The publisher P generally rather wants this e-document E to be accessible as long as possible, to remain attractive to customers, i.e. the user U. Typically the contrasting interests will be matched via pricing. In this example, the expiration date is set to 10 years after last access by any user U. The service provider S hence stores the e-documents E in the p-archive server database and saves the access policy together with the expiration rules in the e-document authorisation module 15 also contained in the p-archive server 10. The publisher P pays the service provider S for his archiving service and for the service to guarantee access to the e-documents E according to the negotiated and determined access policy.

The service provider S will issue an access certificate AC to any user U presenting to the service provider S a unique identifier UID, whereby the access policy and the expiration rules are used. The issued access certificate AC is directly corresponding to the e-document E for which the unique identifier UID has been presented. All users U who identify themselves as being eligible under the access policy will receive the access certificate AC for free or for only a low charge. The issued access certificate AC then grants to the owning user U the right to access or retrieve the corresponding article of said magazine M according to the expiration rules, which are communicated and thus known to the user U. As a special service, the access certificate AC for each requested article may also contain an abstract of the corresponding article.

A first example: Assuming, the (female) user U_A is a subscriber of said magazine M and reads it in the train on her way to work. On each article, its unique identifier UID is printed in form of a barcode. The User U_A reads the unique identifiers UID of articles M2 and M4 with a barcode reader and saves them into her personal archive client, which is a database installed on her laptop computer, because she is about to prepare a talk about the subject covered in those two articles. The personal archive client receives the unique identifiers UID and puts each of them in a separate entry in this archive. For each entry, the personal archive client has an additional field which may be used for personal annotations. The unique identifier UID may appear as well as barcode in the archive entry or be represented as a numeric code or even better, be translated according to a standardized decoding algorithm into plain text which helps the user U_A identify the articles according to their archive entry. In the case of the unique identifier UID being entered into the personal archive client in a coded form, the annotation field may be used to enter for each entry one or more keywords identifying the respective article.

Still in the train, the user U_A writes some comments into the annotation fields. At work, she decides to get herself an access grant for the two articles. She hence decides to present those two unique identifiers UID to the service provider S along with her user credentials or subscription credentials, which consist of her name and her subscription password, which changes on a monthly basis. The user U_A contacts the service provider S via her laptop PC and an Internet connection. The service provider's address is either publicly known or printed in the magazine M or is part of the unique identifier UID and retrieved by the user's web browser from the personal archive client. The service provider S receives the user credentials and the unique identifiers UID and checks the eligibility of the user U_A according to the corresponding access policy and expiration rules. If the service provider S finds that the user U_A is allowed to access the referred articles, he issues an access certificate AC to the user U_A for each of the articles identified by the presented unique identifiers UID, i.e. M2 and M4. For each issued access certificate AC, a small fee may become due (not in the present example).

The access certificates AC for the magazine M are only validated for the period of ten years after the last access to a specific article, which is the time frame in which the user U_A can present her access certificate AC and be sure to be granted access to the corresponding articles. After that time, presenting the access certificate AC will be of no value and may have no effect. The validation period may vary from article to article. The above-mentioned period is not fixed and therefore the user U_A may at any time check by contacting the service provider S how long the actual period is. Another possibility is that the access certificate AC performs automatic updates via the Internet to show the actual validation period. In the case of a fixed validation period, such as ten years from publication, this validation period information may be contained directly in the access certificate AC.

The access certificate AC may contain a time stamp which shows to the user U_A its issuance date and its validation period or its expiry date, such that the user U_A can check at any time whether the access certificate AC is still valid and of use.

The two access certificates AC, one for article M2 and one for article M4, are issued to the user U_A. The user U_A's personal archive client is automatically expanded with the information provided by both access certificates AC, i.e. the abstract is now available in the archive and the guaranteed right has been obtained to access this article within at least the next 10 years. The access certificates are stored also in the personal archive. The access certificates AC may be certificates in the meaning used in encryption protocols, i.e. provide means for verifying their integrity and origin. Thus, the access certificates AC can be checked upon their presentation for any fraudulous attempt to modify them. The access certificate AC, if verified as authentic, identifies the presenting user U_A as a rightful presentor of the access certificate AC to the service provider S.

The user U_A gets a visual feedback on his laptop screen, e.g. via an icon, that she has received the access certificates AC. After a week, the user U_A continues working on her talk and searches her personal archive client. Among other entries, meanwhile entered by reading the unique identifiers UID out of other magazines, she finds again the above mentioned articles and discovers that she only needs the article M4, which she therfore intends to retrieve by presenting the corresponding access certificate AC to the service provider S. She clicks on the access certificate icon which makes the laptop computer send this access certifiacte AC back to the service provider S requesting access to the corresponding article. The laptop computer has saved the origin address of the access certificate AC and thus can easily send the access certificate AC back to the service provider S.

The service provider S receives the access certificate AC and checks its validity and authenticity and comes to the positive result that this certificate is valid. The service provider S then sends the article M4 to the user U_A, or sends her a link to a server, wherefrom the user U_A can download the article M4. Finally the user U_A has the desired article M4 on his computer or in his hands.

Second example: Another (male) user U_B buys said magazine M at a news-stand. He is interested in articles M3, M5, and M6. The user U_B maintains a personal archive on his palmtop computer, equipped with a small barcode reader. He saves all three unique identifiers UID of said articles and some comments thereto in his personal archive client. After a month, he likes to recall what he has read. Therefore, he decides to connect to the service provider S, presents the read unique identifiers UID, his personal credentials containing his name and email address and obtains the corresponding access certificates AC which deliver him the corresponding abstracts. Having received the access certificates AC for all three articles, he decides not to use the access certificates AC of article M3 and M6 for the moment. He however uses the access certificate AC of article M5, he gets this article downloaded and reads it again. After another year, his manager asks him something which reminds him of one of those articles. User U_B searches his personal archive client and finds that the article M6 contains the desired information. He connects again to the service provider S, turns in his access certificate AC for the article M6 and retrieves this article. The fees for the download are paid on-line via credit card.

After ten years, it turns out that no one ever has requested access to the article M3. The service provider S automatically deletes the article M3 from the personal archive server and may even send a message to each user U who once before received the corresponding access certificate AC, that the article M3 is no longer available. The respective users U then may delete their entries for this article M3 from their personal archive clients. Since they never used the article M3, they neither wasted substantial time nor space nor other costs.

Since the user U must know which information he/she has to present as his/her personal credentials, either the unique identifier UID also contains that information which then appears in the personal archive client, or the process for receiving an access certificate AC is split up. The user U first presents the unique identifier UID to the service provider S, who then requests the user U to present his user credentials. In this case, it is exactly specified in the request from the service provider S what the user credentials have to contain. Finally, the user U presents his/her user credentials to the service provider S.

It should have become clear from the above description that the invention contains the idea of not granting direct access, but using an option model, i.e. granting, typically for a limited amount of time, the right to access the e-document E. The following remarks shall give the person skilled in the art some ideas how to implement some of the function described above—the details of such implementations should present no problems.

Document upload and download can be managed via FTP. The unique identifiers UID may be generated similar to the generation of Internet address space allocation performed e.g. by ICANN (Internet Corporation for Assigned Names and Numbers) under the Internet protocol IP, as described in www.icann.org. The storage for the e-documents E may be a decentralized storage like in Lotus Notes databases, the latter being a trademark of Lotus Corp. The unique identifier UID on the document, i.e. the real object, may be printed as bar code, for which readers are readily available on the market. The bibliography manager 2 in FIG. 2 for managing the personal listings in the p-archive client can be installed as a software product on any desktop, mobile computer and even hand-held devices, e.g. on a palm pilot, smartphone or the like. The user interface may be a conventional Internet browser.

The p-archive server may in fact be a hierarchy of servers. For the exchange of IDs, access certificates AC, or any other data that deserve protection, public key or other cryptosystems can be used. It might be desirable to use a standardized data format for the e-documents E, for which the widespread PDF format is a good candidate. Means for assigning and/or attaching can be a printer, plotter, stamping machine or any other graphical output device, including outputting equivalents thereof such as Braille-coded identifiers.

It is obvious for the person skilled in the art that the present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments.

It is obvious that a person skilled in the art can modify the shown arrangements in many ways without departing from the gist of the invention which is encompassed by the subsequent claims.

What is claimed is:

1. A method for managing a personal e-document archive of e-documents within a larger collection of e-documents including depositing and making available an electronic copy (E) of a real object to a first party as user (U) as part of the first party's personal e-document archive by a second party (P) within the second party's e-document archive, said method comprising assigning and/or attaching a readable unique identifier (UID) to said real object,
creating and depositing said electronic copy (B) of said real object with its associated unique identifier (UID),
making available to said user (U) said real object together with said unique identifier (UID), said unique identifier (UID) being presentable to said second party (P) or a third party (S) during an authorization period in which said electronic copy (E) is available to said user (U) to obtain an access certificate (AC) in place of said electronic copy (E), the access certificate granting to the user (U) an option to obtain future access to said electronic copy (B) anytime during a predefined period that may be longer than said authorization period, and after no unique identifiers (UID) have been presented to the service provider (S) and the expiration of access certificates for the said electronic copy (E), deleting the said electronic copy (E).

2. The method according to claim 1, wherein the unique identifier (UID) is obtained by the first party (U) from the real object.

3. The method according to claim 1, wherein the unique identifier (UID) is printed on or attached to the real object and/or displayed with or attached to the electronic copy (E) thereof.

4. The method according to claim 1, wherein the unique identifier (UID)
- is selected out of a predetermined group of usable unique identifiers (UID), said group being preferably determined by an authorization instance, or
- is selected by said authorization instance.

5. The method according to claim 1, wherein the access certificate (AC)
- is validated for a limited amount of time, in particular to a specific user (U) and/or for a specific real object, or expires generally after a time limit.

6. The method according to claim 1, wherein the access certificate (AC) is issued only if the user (U) presenting the unique identifier (UID) is found eligible under a predetermined access policy for the corresponding electronic copy (E), said access policy being preferably determined by the second party (P).

7. The method according to claim 1, wherein the second (P) party distributes the real object and provides the electronic copy (E),
- the third party (S) assigns the unique identifier (UID),
- said second party (P) or said third party (S) issues the access certificate (AC), and
- said second party (P) or said third party (S) provides the access to the electronic copy (E).

8. Computer program product according to claim 1, comprising the program code means stored on a computer-readable medium.

9. A method for managing a personal e-document archive of e-documents within a larger collection of e-documents including archiving and retrieving an electronic copy (E) of a real object in a system with a plurality of e-documents and a plurality of first parties as users (U) and at least one second party (P or S) for distributing and/or providing archiving and retrieving services, said method comprising
- assigning and/or attaching a unique identifier (UID) to said real object,
- distributing said real object with said identifier (UID) attached,
- storing an electronic copy of said distributed real object associated with its respective identifier (UID) in a first memory space,
- storing, if selected by said user (U), said object's identifier (UID) in a second memory space serving as personal archive allocated to and/or accessible by said user (U) as a personal e-document archive of e-documents of said user,
- said unique identifier (UID) being presentable anytime during an authorization period for obtaining an access certificate (AC) by said user (U) in place of said electronic copy (E), said access certificate (AC) enabling said user (U) to obtain said electronic copy (E) in the future, and
- after no unique identifiers (UID) have been presented to the service provider (S) and the expiration of access certificates for the said electronic copy (E), deleting the said electronic copy (E) from said second party's e-document archive.

10. Arrangement for depositing and making available an electronic copy (E) of a real object to a first party as user (U) as part of an arrangement for managing a personal e-document archive of e-documents within a larger collection of e-documents including by a second party (P) and/or a third party (S), comprising
- an output device for associating a readable unique identifier (UID) with said real object,
- a device for depositing said electronic copy (E) with its associated unique identifier (UID),
- said unique identifier (UID) being readable by said user (U) and presentable to said second party (P) or said third party (S) to obtain an access certificate (AC) in place of the electronic copy (E), said access certificate being an option to receive future access to said electronic copy (E); and deleting said electronic copy upon the expiration of all of said access certificates for the electronic copy (E) associated with said unique identifier(UID).

11. Arrangement for a first party (U) to obtain an access right to a deposited electronic copy (E) of a real object, as part of an arrangement for managing a personal e-document archive of e-documents within a larger collection of e-documents comprising
- a reader for reading a unique identifier (UID) from a real object,
- a storage for storing at least said read unique identifier (UID), and
- an authorization module at a second party (P) or a third party (S) for receiving said read unique identifier (UID) from said first party (U) and sending an access certificate (AC), to said first party in place of immediate access to said electronic copy (E), said access certificate (AC) serving as an option for said first party to obtain access to said electronic copy (E) in the future said authorization module adapted for deleting said electronic copy upon the expiration of all of said access certificates for the electronic copy (E) associated with said unique identifier(UID).

* * * * *